United States Patent
Lee et al.

(10) Patent No.: US 10,129,272 B2
(45) Date of Patent: Nov. 13, 2018

(54) NETWORK APPARATUS FOR PAIRING WITH USER DEVICE AND PAIRING METHOD THEREOF

(71) Applicant: SAMSUNG ELECTRONICS CO., LTD., Suwon-si, Gyeonggi-do (KR)

(72) Inventors: Dong-ik Lee, Seongnam-si (KR); Choong-hoon Lee, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 80 days.

(21) Appl. No.: 14/934,604

(22) Filed: Nov. 6, 2015

(65) Prior Publication Data
US 2017/0034191 A1 Feb. 2, 2017

(30) Foreign Application Priority Data
Jul. 30, 2015 (KR) .................. 10-2015-0107933

(51) Int. Cl.
*H04L 9/32* (2006.01)
*H04L 29/06* (2006.01)
(Continued)

(52) U.S. Cl.
CPC ...... *H04L 63/1416* (2013.01); *H04L 63/0428* (2013.01); *H04L 63/061* (2013.01);
(Continued)

(58) Field of Classification Search
CPC .. H04L 63/1416; H04L 63/0428; H04L 63/61
See application file for complete search history.

(56) References Cited

U.S. PATENT DOCUMENTS

2008/0052779 A1 2/2008 Sinha et al.
2013/0173811 A1 7/2013 Ha et al.
(Continued)

FOREIGN PATENT DOCUMENTS

| KR | 10-2013-0080487 | 7/2013 |
|---|---|---|
| KR | 10-2015-0028279 | 3/2015 |
| WO | 2014/063100 | 4/2014 |

OTHER PUBLICATIONS

J. Xiong, Q. Qin and K. Zeng, "A Distance Measurement Wireless Localization Correction Algorithm Based on RSSI," 2014 Seventh International Symposium on Computational Intelligence and Design, Hangzhou, 2014, pp. 276-278. doi: 10.1109/ISCID.2014.246 (Year: 2014).*

(Continued)

*Primary Examiner* — Alexander Lagor
*Assistant Examiner* — Vu V Tran
(74) *Attorney, Agent, or Firm* — Nixon & Vanderhye P.C.

(57) ABSTRACT

A network apparatus for performing a pairing with a user device, with the network apparatus already paired with a broker apparatus is disclosed, the network apparatus including a communicator including communication circuitry; a storage configured to store an RSSI value measured in the network apparatus and broker apparatus regarding a signal being exchanged with the broker apparatus with the broker apparatus at a close position; and a processor configured to determine whether the user device is close to the broker apparatus by as much as a predetermined distance based on each RSSI value measured in the network apparatus, broker apparatus, and user device regarding a signal being exchanged with the user device, an RSSI value measured regarding a signal being received from the broker apparatus, and a predetermined condition regarding a relationship between each RSSI value stored, and in response to determining that the user device is close to the broker apparatus (Continued)

by as much as the predetermined distance, to control the communication circuitry to perform an association for pairing with the user device.

14 Claims, 9 Drawing Sheets

(51) Int. Cl.
*H04W 12/06* (2009.01)
*H04W 76/14* (2018.01)
*H04W 8/00* (2009.01)

(52) U.S. Cl.
CPC ............ *H04W 12/06* (2013.01); *H04W 8/005* (2013.01); *H04W 76/14* (2018.02)

(56) References Cited

U.S. PATENT DOCUMENTS

| | | | | |
|---|---|---|---|---|
| 2014/0064116 A1* | 3/2014 | Linde | ............... | H04W 4/021 370/252 |
| 2014/0080421 A1 | 3/2014 | Lee | | |
| 2014/0135880 A1* | 5/2014 | Baumgartner | ..... | A61N 1/37288 607/115 |
| 2014/0185464 A1* | 7/2014 | Yang | ............... | G01S 5/0215 370/252 |
| 2014/0269478 A1 | 9/2014 | Choi et al. | | |
| 2014/0380419 A1* | 12/2014 | Peluso | ............... | H04W 12/06 726/3 |
| 2015/0085725 A1 | 3/2015 | Estevez et al. | | |
| 2015/0215292 A1* | 7/2015 | Novicov | ............... | H04W 12/02 713/168 |
| 2015/0332248 A1* | 11/2015 | Weksler | ............ | G06Q 20/3226 705/71 |
| 2016/0050526 A1* | 2/2016 | Liu | ............... | H04W 4/70 455/457 |
| 2016/0249156 A9* | 8/2016 | Varoglu | ............... | H04W 4/21 |

OTHER PUBLICATIONS

Search Report and Written Opinion dated May 30, 2016 in counterpart International Patent Application No. PCT/KR2015/0011938.
Lee, "The Method of Secure Pairing based on Signal Path Loss using RSSI in IoT environment", Samsung Best Paper Award 2015, May 7, 2015, 2 pages.
Lee, "The Method of Secure Pairing based on Signal Path Loss using RSSI in IoT Environment", KSII the 10$^{th}$ APIC-IST 2015, Jun. 1, 2015, 3 pages.

* cited by examiner

NETWORK APPARATUS FOR PAIRING WITH USER DEVICE AND PAIRING METHOD THEREOF

CROSS-REFERENCE TO RELATED APPLICATION

This application is based on and claims priority under 35 U.S.C. § 119 to Korean Patent Application No. 10-2015-0107933, filed on Jul. 30, 2015, in the Korean Intellectual Property Office, the disclosure of which is incorporated by reference herein in its entirety.

BACKGROUND

Field

The disclosure relates to a network apparatus for pairing with a user device and a pairing method thereof, and for example, to a network apparatus wherein pairing with a user device has increased security, and a pairing method thereof.

Description of Related Art

With the recent development of communication technology, devices such as smart phones and PDAs (Personal Digital Assistants) that are portable and easy to use are being widely used. As more and more of such portable devices are being used, there will be a growing need to exchange information stored in different devices between those devices.

In cases where two user devices intend to use the same wireless communication functions, it is necessary to set the connection information between the two user devices and perform a pairing between them in order to perform wireless communication. In conventional methods, in order to prevent pairing between unauthorized devices, association keys and encryption keys are predetermined at the production stage, and then it is required to either input an SSID and password on the devices when connecting the network or to perform an association process using physically provided buttons or chips and the like, and then to exchange the encryption keys.

However, the problem is that passwords cannot be input in the case of pairing devices that do not have displays, and providing buttons or chips increases the manufacturing cost. Especially, since association keys and encryption keys are predetermined at the production stage, the devices may be prone to "man in the middle attack" such as sniffing and spoofing by the same type of remotely located unauthorized products during the association process or the process of exchanging encryption keys, and further, the devices that can be paired are limited to only the same type of products, which is also a problem.

Thus, there needs to be a way to perform an association for pairing between various devices more easily, and to increase security by preventing and/or reducing the likelihood of a "man in the middle attack" by unauthorized remote devices.

SUMMARY

Example embodiments of the disclosure address the above disadvantages and other disadvantages not described above.

Various examples of the disclosure are directed to providing a network apparatus that enables pairing with a desired device more safely by preventing or reducing the likelihood of a "man in the middle attack" pairing by a remote unauthorized device, and a pairing method thereof.

According to an example of the disclosure, a network apparatus for performing a pairing with a user device, with the network apparatus already paired with a broker apparatus, is provided, the network apparatus including a communicator including communication circuitry configured to perform an association for pairing devices; a storage (e.g., a memory) configured to store each RSSI value measured in each of the network apparatus and broker apparatus regarding a signal being exchanged with the broker apparatus with the broker apparatus at, for example, a close position; and a processor configured to determine whether the user device is close to the broker apparatus by as much as a predetermined distance based on each RSSI value measured in the network apparatus, broker apparatus, and user device regarding a signal being exchanged with the user device, an RSSI value measured regarding a signal being received from the broker apparatus, and a predetermined condition regarding a relationship between each RSSI value stored, and in response to determining that the user device is close to the broker apparatus by as much as the predetermined distance, to control the communication circuitry of the communicator to perform an association for pairing with the user device.

The processor may be configured to determine an RSSI attenuation value based on a distance with the broker apparatus using at least one of each RSSI value stored, to determine whether the predetermined condition is satisfied based on the determined RSSI attenuation value, and, in response to determining that the predetermined relationship is satisfied, to determine that the user device is close to the broker apparatus by as much as the predetermined distance.

The predetermined relationship condition may, for example, include a first condition and a second condition, the first condition being a condition where a difference between the RSSI value measured in the broker apparatus and the RSSI value measured in the network apparatus regarding the signal being received from the user device is within a predetermined range of the RSSI attenuation value, and the second condition being a condition where a difference between the RSSI value measured in the broker apparatus and the RSSI value measured regarding the signal that the user device received from the network apparatus is within a predetermined range of the RSSI attenuation value.

In response to the association with the user device being completed, the processor may be configured to form a channel based on a Diffie-Hellman key exchange method and to perform the pairing with the user device.

The processor may be configured to determine whether a man in the middle attack occurred based on each RSSI value measured by the broker apparatus regarding an asymmetric key being exchanged with the user device according to the Diffie-Hellman key exchange method.

The processor may be configured to determine whether the man in the middle attack occurred by comparing at least one of the RSSI values measured by the broker apparatus regarding the asymmetric key being exchanged with the user device with the RSSI value measured when the association of the user device is performed.

The broker apparatus may be configured to store the RSSI value being measured when the association with the user device is being performed, and in response to a difference between at least one of the RSSI values measured regarding the asymmetric key being exchanged with the user device and the RSSI value measured when the association with the user device is performed being outside a predetermined range, to transmit information on the difference to the network apparatus, and in response to receiving the information, the processor may be configured to determine that a man in the middle attack occurred, and to transmit information that a man in the middle attack occurred to the user device.

The communicator includes communication circuitry that may be configured to perform a pairing with the broker apparatus and user device by the Zigbee method.

According to another example of the disclosure, a pairing method of a network apparatus for pairing with a user device with the network apparatus paired with the broker apparatus is provided, the method including storing each RSSI value measured by the network apparatus and broker apparatus regarding a signal being exchanged with the broker apparatus with the broker apparatus at a close position to the user device; determining whether the user device is close to the broker apparatus by as much as a predetermined distance based on each RSSI value measured in the network apparatus, broker apparatus, and user device regarding a signal being exchanged with the user device, an RSSI value measured regarding a signal being received from the broker apparatus, and a predetermined condition regarding a relationship between each RSSI value stored; and performing an association for pairing the broker device with the user device in response to determining that the user device is close to the broker apparatus by as much as the predetermined distance.

Determining whether the user device is close to the broker apparatus by as much as the predetermined distance may include determining an RSSI attenuation value based on a distance from the broker apparatus using at least one of the RSSI values stored; determining whether the predetermined relationship condition is satisfied based on the determined RSSI attenuation value; and in response to determining that the predetermined relationship condition is satisfied, determining that the user device is close to the broker apparatus by as much as the predetermined distance.

The predetermined relationship condition may include a first condition and second condition, the first condition being a condition where a difference between the RSSI value measured in the broker apparatus and the RSSI value measured in the network apparatus regarding the signal being received from the user device is within a predetermined range of the RSSI attenuation value, and the second condition being a condition where a difference between the RSSI value measured in the broker apparatus among the RSSI values stored and the RSSI value measured regarding the signal that the user device received from the network apparatus is within a predetermined range of the RSSI attenuation value.

The method may further include forming a channel based on a Diffie-Hellman key exchange method to perform pairing with the user device.

Forming a channel may include determining whether a man in the middle attack occurred based on each RSSI value measured by the broker apparatus regarding an asymmetric key being exchanged with the user device according to the Diffie-Hellman key exchange method.

Forming a channel may include determining whether the man in the middle attack occurred by comparing at least one of the RSSI values each measured by the broker apparatus regarding the asymmetric key being exchanged with the user device with the RSSI value measured when the association of the user device is performed.

The broker apparatus may be configured to store the RSSI value being measured when the association with the user device is being performed, and, in response to a difference between at least one of the RSSI value each measured regarding the asymmetric key being exchanged with the user device and the RSSI value measured when the association with the user device is performed being outside a predetermined range, and to transmit information on the difference to the network apparatus, and forming a channel includes, in response to receiving the information that a difference between at least one of the RSSI value each measured regarding the asymmetric key being exchanged with the user device and the RSSI value measured when the association with the user device is performed is outside the predetermined range, determining that a man in the middle attack occurred.

The network apparatus may perform a pairing with the broker apparatus and user device by the Zigbee method.

According to the aforementioned various examples of the disclosure, it is possible to prevent and/or reduce the likelihood of a "man in the middle attack" pairing by a remote unauthorized device, thereby performing pairing with a desired device more safely.

BRIEF DESCRIPTION OF THE DRAWINGS

The above and/or other aspects of the disclosure will be more apparent from the following detailed description, taken in conjunction with the accompanying drawings, in which like reference numerals refer to like elements, and wherein.

DETAILED DESCRIPTION

Figure 1:
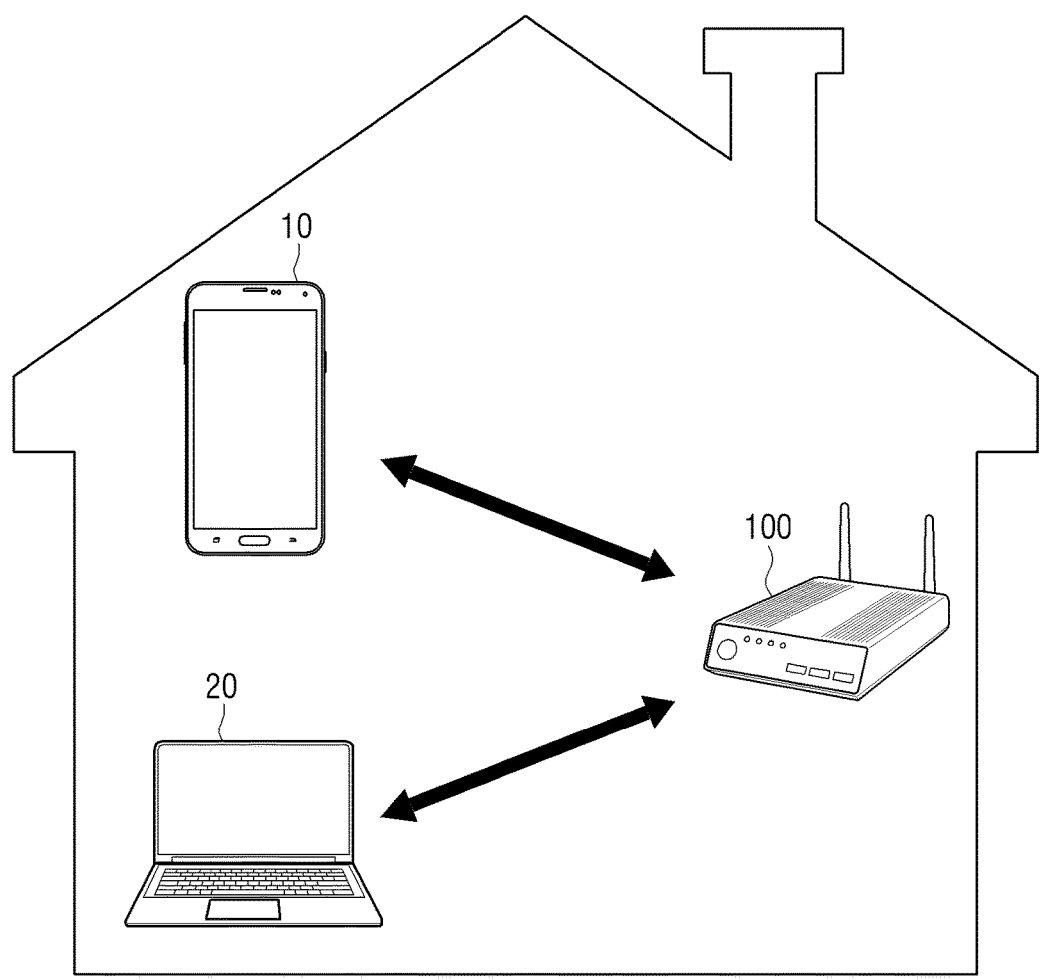
FIG. 1 is a view illustrating an example system in which a pairing is performed between a network apparatus, broker apparatus, and user device.

Certain examples of the disclosure will now be described in greater detail with reference to the accompanying drawings.

In the following description, same drawing reference numerals are used for the same elements even in different drawings. The matters defined in the description, such as detailed construction and elements, are provided to assist in an understanding of the disclosure. Thus, it is apparent that the examples of the disclosure can be carried out without those specifically defined matters. Also, well-known functions or constructions are not described in detail since they may obscure the disclosure with unnecessary detail.

The example embodiments of the disclosure may be diversely modified. Accordingly, specific example embodiments are illustrated in the drawings and are described in detail in the detailed description. However, it is to be understood that the disclosure is not limited to a specific example embodiment, but includes all modifications, equivalents, and substitutions without departing from the scope and spirit of the disclosure. Also, well-known functions or constructions are not described in detail since they may obscure the disclosure with unnecessary detail.

FIG. 1 is a view illustrating an example system where a pairing is performed between a network apparatus, broker apparatus, and user device.

As illustrated in FIG. 1, a network may, for example, be formed between a plurality of devices that are within, for example, an indoor area. FIG. 1 illustrates an example case where a plurality of devices within the indoor area form a network by way of, for example, the Zigbee wireless communication standard method which includes the IEEE 802.15.4 standard, the short-distance wireless communication standard, as a representative example. However, as will be explained below, the technical concept of the disclosure is not limited to Zigbee wireless communication method, but it will be readily understood by those skilled in the art that the disclosure may be applied to various network methods such as, for example, Wi-Fi, Bluetooth and the like.

The network apparatus 100 may form a Zigbee network between a plurality of devices. For example, the network apparatus 100 may form a Zigbee network in the format of star topology, mesh topology or tree topology, or the like. The Zigbee network may be differentiated by network information such as PAN ID (Personal Area Network IDentification) and channels and connect various devices. Devices that form a Zigbee network may, for example, set a communication channel from 10 m to a maximum range of 1 km, and transmit data wirelessly at a speed of about 250 Kbps.

The network apparatus 100 may manage each node of the Zigbee network, and allocate a network address to each node. For example, the network apparatus 100 may be configured as an FFD (Full Function Device) that may be operated as a coordinator. It may, for example, perform the role of a gateway between an Ethernet backbone as well. In this case, it is desirable that the network apparatus 100 is an apparatus that is provided with power continuously.

The network apparatus 100 may, for example, operate as a trust center, or be configured to perform the role of storing the inherent information of the network such as the role of a storage for encryption keys.

The broker apparatus 10 may, for example, be an end device that is connected to the network apparatus 100 and that is paired with the network apparatus 100. The broker apparatus 10 already paired with the network apparatus 10 may be involved in the association and encryption key exchanging process of the user device 20 in an example process where the user device 20 is being paired with the network apparatus 100.

For example, the broker apparatus 10 measures an RSSI (Receive Signal Strength Indicator) value of a signal being exchanged between the user device 20 and network apparatus 100, and transmits the measured value to the network apparatus 100. The network apparatus 100 may determine whether or not a distance between the broker apparatus 10 and user device 20 is within a predetermined distance based on the received RSSI value. When the distance between the broker apparatus 10 and the user device 20 is within the predetermined distance, the user device 20 may be associated. This is to prevent and/or reduce the likelihood of a hacking attack of another remote user device taking over an association key through sniffing or spoofing and performing pairing with the network apparatus 100. An example method of associating the user device 20 using the RSSI will be explained below with reference to FIGS. 3 to 5.

The user device 20 may, for example, be an end device that may be connected to the network apparatus 100 and perform a pairing. Examples of the user device 20 may include not only end devices that may communicate with the network apparatus 100 and the broker apparatus 10 in a same network method and provided with a display such as a computer, notebook computer, smart phone, and PDA, but also various end other devices that do not have a display.

The user device 20 may, for example, be realized as a plurality of devices placed at each end of the topology. Any one of the user devices 20 paired with the network apparatus 100 may function as the broker apparatus for another user device 20 not paired yet.

Figure 2:
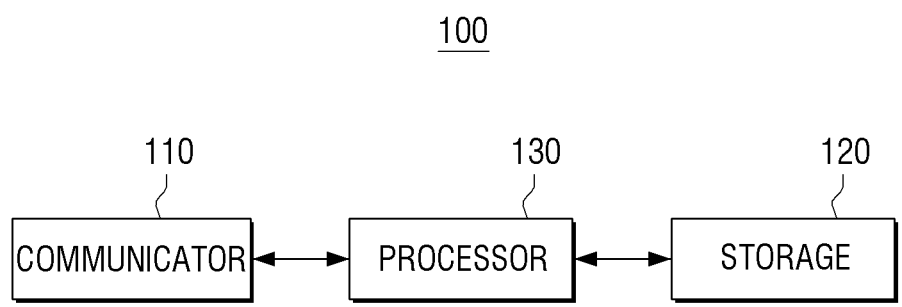
FIG. 2 is a block diagram schematically illustrating an example configuration of a network apparatus.

FIG. 2 is a block diagram schematically illustrating an example configuration of a network apparatus.

According to FIG. 2, the network apparatus 100 according to an example of the disclosure includes a communicator comprising communication circuitry 110, storage (e.g., a memory) 120, and a processor 130.

The communicator 110 is a component configured to perform communication with the broker apparatus 10 and user device 20, such as, for example, configurable communication circuitry. For example, the communicator 110 may transceive data wirelessly in the Zigbee communication method, and may include an antenna, RF transceiver, and MAC address processor for RF signal processing of the Zigbee communication method. The communicator 110 may be configured to convert the data to be transceived into RF signals and then transceive the RF signals according to the Zigbee standard, and may also be configured to convert the RF signals received into data signals. For this purpose, the communicator 110 may, for example, be provided with a Zigbee communication module embedded therein.

The data being transceived through the communicator 110 may, for example, include identification information including association keys. The communicator 110 may be configured to compare its identification information with the identification information on the data being received, and determine whether the two information correspond to each other. If the information do not correspond to each other, the communicator 110 may be configured to not transceive the data.

The storage (e.g., a memory) 120 may store various programs for operating the processor 130. The storage 120 may, for example, be realized as one of an HDD (Hard Disk Drive), SDD (Solid State Drive), DRAM memory, SRAM, memory, FRAM memory and flash memory. For example, when a pairing between the broker apparatus 10 and network apparatus 100 is being set, the storage 120 may store each RSSI value measured in the network apparatus 100 and broker apparatus 10. For example, with the broker apparatus 10 close to the network apparatus 100 as much as a predetermined distance, the storage 120 may store each RSSI value measured in the network apparatus 100 and broker apparatus 10 regarding a signal being exchanged with the broker apparatus 10.

An RSSI (Receive Signal Strength Indicator) is an indicator of the intensity of a received signal, and may be used to measure a distance between devices. Generally, for example, the higher the RSSI value, the higher the intensity of the signal received, and the closer the distance between the devices, the higher the RSSI value is measured.

The storage 120 may store a list of channels to be used between the broker apparatus 10 and user device 20. For example, the IEEE 802.15.4 communication standard regulating Zigbee allocates 16 channels in 2.4 GHz band, 10 channels in 902 MHz-928 MHz band, and 1 channel in 868 MHz-870 MHz band.

The processor 130 is a component configured to control the overall operations of the network apparatus 100.

The processor 130 is configured to control the communicator 110 to transceive data with the broker apparatus 10 and user device 20. The processor 130 may, for example, be configured to set a transceive channel with the broker apparatus 10 using a channel set in the channel list.

The processor 130 may be configured to determine an RSSI (Receive Signal Strength Indicator) of a signal received from the broker apparatus 10 and user device 20. The method for determining an RSSI of a signal will be readily apparent to those skilled in the art, and thus a detailed explanation thereof will be omitted.

With the network apparatus 100 and broker apparatus 10 paired to each other, the processor may be configured to control operations such that a signal for pairing with the user device 20 is exchanged. The processor 130 may be configured to determine whether the user device 20 is close to the broker apparatus 10, for example, within the predetermined distance based on each RSSI value measured in the network apparatus 100, broker apparatus 10, and user device 20 regarding a signal being exchanged with the user device, an RSSI value measured regarding a signal being received from the broker apparatus 10, and a predetermined condition regarding a relationship between each RSSI value stored in the storage 120.

This will be explained with reference to FIGS. 3 to 5.

Figure 3:
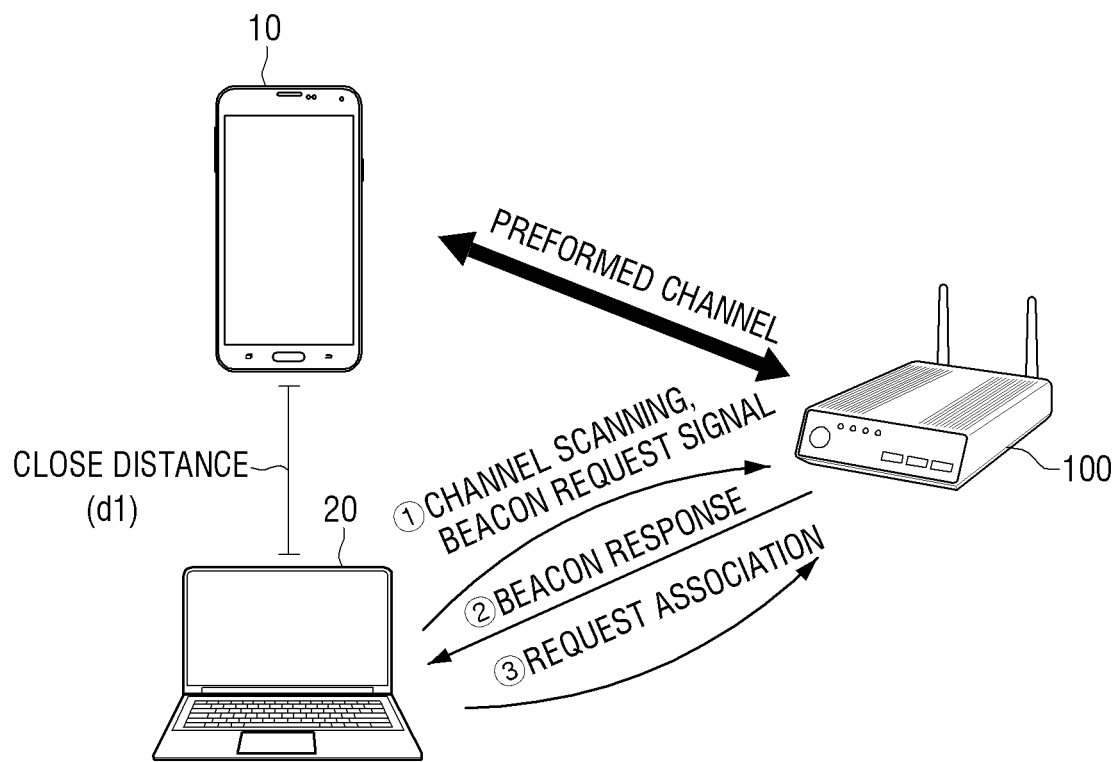
FIGS. 3 to 5 are views illustrating an example method for performing an association for pairing between a network apparatus and user device.
Figure 4:
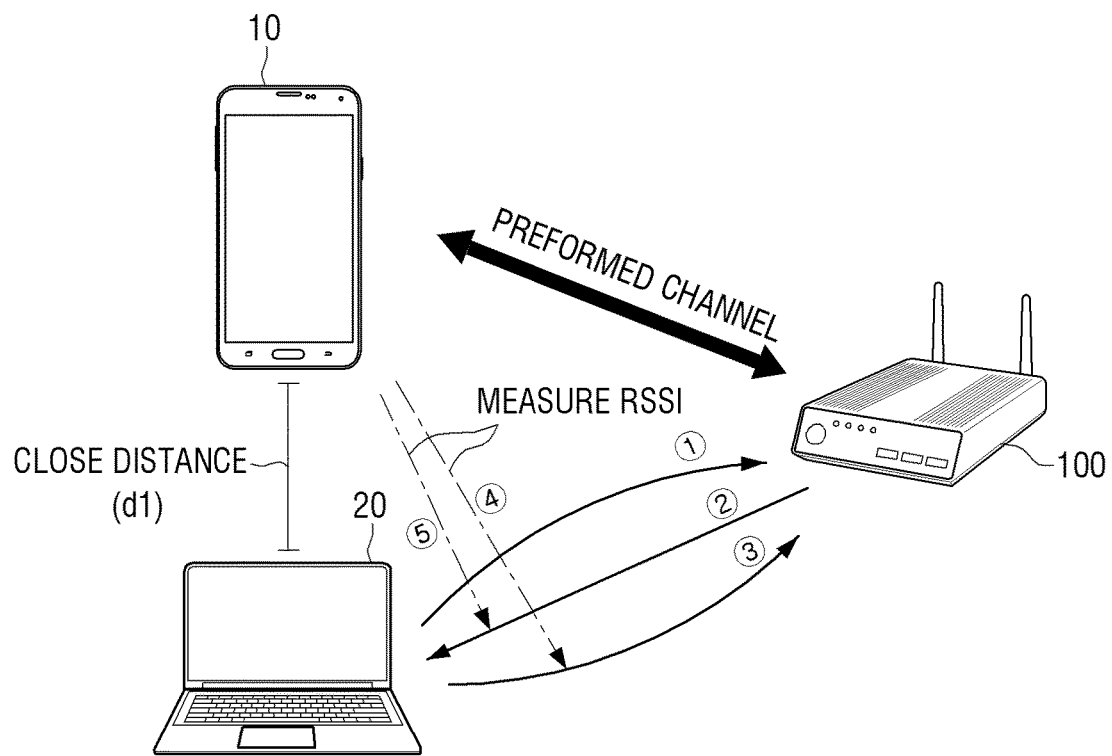
Figure 5:
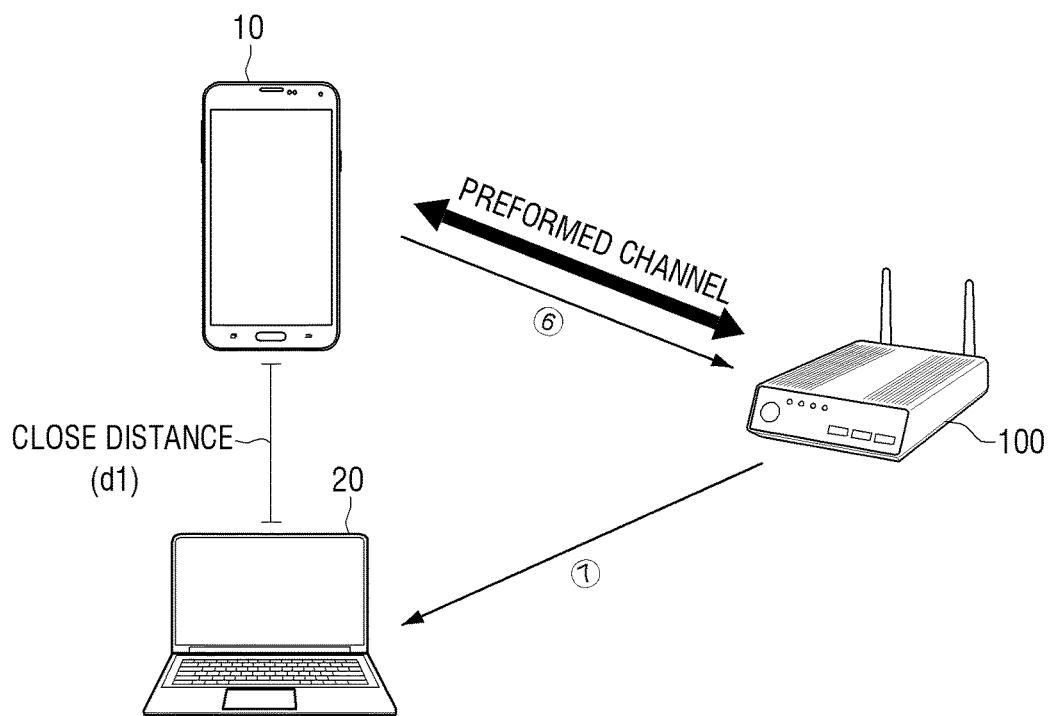

FIGS. 3 to 5 are views illustrating an example method for performing an association for a pairing between the network apparatus and user device.

For example, referring to FIG. 3, the user device 20 intending to participate in a Zigbee network must be within the predetermined close distance (d1) with the broker apparatus 10 that is already paired. The broker apparatus 10 may perform an ED (Energy Detection) on all channels to scan the channel list (channel scanning) and broadcast a beacon request packet (①).

After the broadcasting is completed, when the user device 20 selects an unrepeated PAN ID, the processor 130 may configured to control operations such that a beacon response packet providing a notification that a PAN exists is transmitted to the user device 20 (②). The user device 20 that received the beacon response packet may transmit an association request packet to the network apparatus 100(③).

The user device 20 may measure an RSSI value (C) regarding the beacon response packet and transmit the measured RSSI value to the network apparatus 100. Herein, the RSSI value (C) regarding the beacon response packet may be included in the association request packet and be transmitted to the network apparatus 100. Furthermore, the processor 130 may be configured to measure the RSSI value (D) regarding the association request packet.

Referring to FIG. 4, the broker apparatus 10 may measure an RSSI value (E) regarding the association request packet being transmitted to the network apparatus 100 from the user device 20(④). Furthermore, the broker apparatus 10 may measure an RSSI value (F) regarding the beacon response packet being transmitted to the user device 20 from the network apparatus 100 (⑤).

Referring to FIG. 5, the processor 130 may be configured to request the RSSI value (E) regarding the association request packet measured in the broker apparatus 10, and the RSSI value (F) regarding the beacon response packet, and in response, the broker apparatus 10 may transmit a packet including the two RSSI values (E, F) to the network apparatus 100 (⑥).

The processor 130 may be configured to measure or determine an RSSI value (G) regarding the packet including the two RSSI values (E, F) being received by the network apparatus 100.

The processor 130 may be configured to compare identification information included in an association request packet with the identification information on the network apparatus 100 and to determine whether the user device is one with which a pairing has been allowed. Even if the two identification information correspond to each other, the processor 130 may be configured to determine whether the user device 20 is close to the broker apparatus 10 within the predetermined distance (d1), and if not, the processor 130 may be configured to not perform an association.

For example, the processor 130 may be configured to determine whether the user device 20 is close to the broker apparatus 10 within the predetermined distance (d1) based on a predetermined condition regarding a relationship between RSSI values (A, B) stored in the storage 120 and RSSI values (C, D, E, F, G) measured in each node of the Zigbee network. In response to determining that the user device 20 is close to the broker apparatus 10 within the predetermined distance (d1), the processor 130 may be configured to control the communication circuitry of the communicator 110 to perform an association for pairing with the user device 20.

The predetermined distance (d1) may, for example, desirably be within 10 cm, but without limitation, and thus it may be set to various distances such as 50 cm, 1 m or the like.

The processor 130 may be configured to determine an RSSI attenuation value that is in accordance with a difference between the RSSI value (A) stored in the storage 120 and the RSSI value (F) measured based on the distance between the current network apparatus 100 and broker apparatus 10. However, the RSSI attenuation value may, for example, be determined based on a difference between the RSSI value (B) stored in the storage 120 and the RSSI value (G) measured based on the distance between the current network apparatus 100 and broker apparatus 10.

The processor 130 may be configured to determine whether the predetermined condition is satisfied based on the determined RSSI attenuation value. The predetermined condition may, for example, include a first condition and second condition.

The first condition may, for example, be a condition where the difference (E-D) between the RSSI value measured in the broker apparatus 10 and the RSSI value measured in the network apparatus 100 regarding the signal received from the user device 20 is close to the RSSI attenuation value (B-G) within a predetermined range. The second condition may be a condition where the difference (A-C) between the RSSI value measured in the broker apparatus 10 among the RSSI values stored in the storage 120 and the RSSI value measured regarding the signal that the user device 20 received from the network apparatus 100 is close to the RSSI attenuation value (B-G) within a predetermined range.

For example, the RSSI attenuation value, that is a propagation loss (L) based on the distance between two nodes may be determined based on Friis's Formula L=20 log 10 $(4\pi d/\lambda)$(dBm). This may be expressed more simply as L=$\alpha$*log 10(d)(dBm). Herein, d is the distance between the network apparatus 100 and broker apparatus 10, and $\alpha$ may be an indefinite constant that is determined according to the network environment and frequency band used. Herein, the relationship between Tx which is the signal intensity at a transmitting end and Rx which is the signal intensity measured at a receiving end may be expressed as below.

$$Tx\ [dBm] = L + \beta + Rx \qquad \text{[Formula 1]}$$

Herein, β is an indefinite constant that is determined based on the network environment and frequency band used.

Relational formulas for the RSSI value measured in each node derived using the Friis's Formula and Formula 1 are shown below.

$$B\text{ [dBm]}=L+\beta+G \text{ or } A\text{ [dBm]}=L+\beta+F \quad \text{[Formula 2]}$$

$$E\text{ [dBm]}=L+\beta+D \quad \text{[Formula 3]}$$

$$A\text{ [dBm]}=L+\beta+C \quad \text{[Formula 4]}$$

From Formulas 2 to 4, the following relational formula may be derived.

$$B-G=E-D=A-C\text{ [dBm] or }A-F=E-D=A-C\text{ [dBm]} \quad \text{[Formula 5]}$$

Herein, B−G may refer to the RSSI attenuation value according to the distance between the current network apparatus 100 and broker 10. However, B−G, E−D and A−C need not be exactly the same. If it is determined that they are the same within a predetermined error range, it may be determined that the predetermined condition is satisfied. For example, the error range may be predetermined to ±5%.

In response to determining that the predetermined condition (Formula 5) is satisfied, the processor 130 may be configured to determine that the user device 20 is close to the broker apparatus 10 within the predetermined distance (d1), and to control the communication circuitry of the communicator 110 to perform an association for pairing with the user device 20. For example, the processor 130 may be configured to transmit an association response packet that includes a PAN ID and network address (Assigned short address) to the user device 20 and perform the association of the user device 20(⑦).

In response to the association of the user device 20 being completed, the processor 130 may be configured to form a channel using the Diffie-Hellman key exchange method, and to perform a pairing with the user device 20. The processor 130 may be configured to determine whether a man in the middle attack occurred regarding an asymmetric key being exchanged with the user device 20 in the Diffie-Hellman key exchange method based on the RSSI values measured by the broker apparatus 10. This will be explained in more detail below with reference to FIGS. 6 and 7.

Figure 6A:
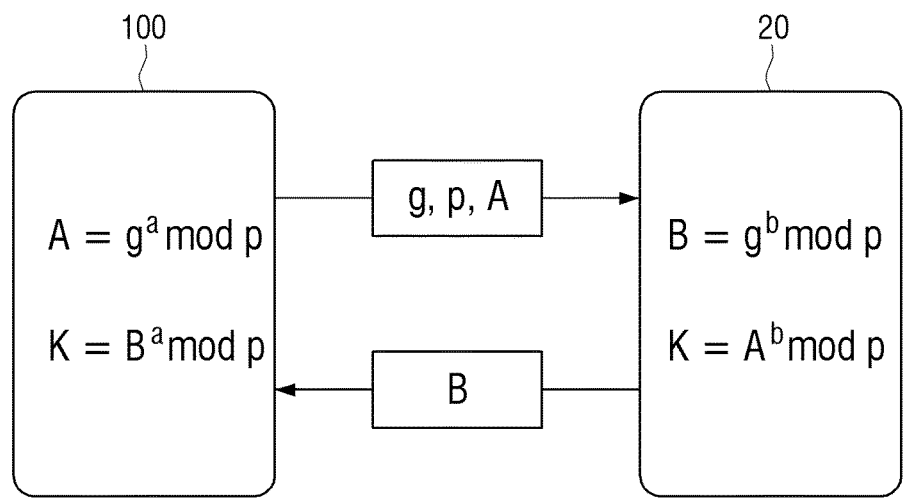
FIG. 6A, FIG. 6B and FIG. 7 are views illustrating an example method for determining whether or not there is a "man in the middle attack" in exchanging encryption keys according to the Diffie-Hellman key exchange method.
Figure 6B:
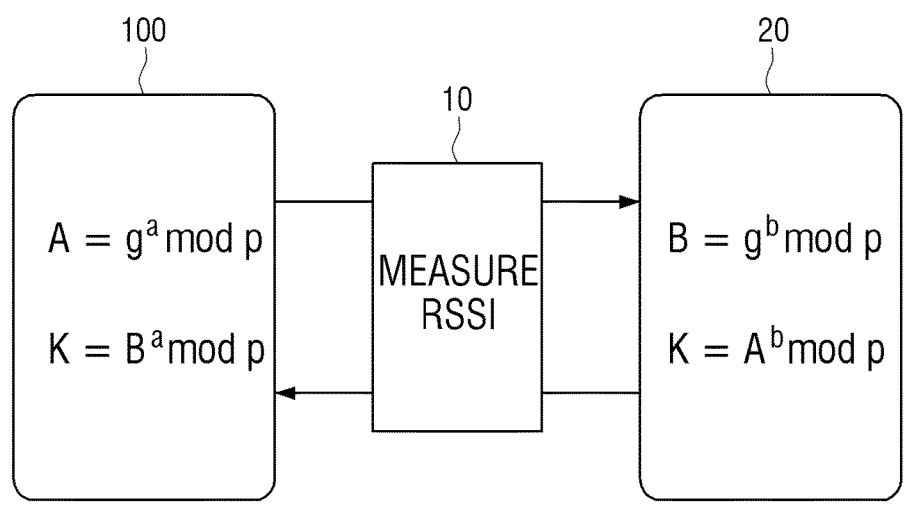
Figure 7:
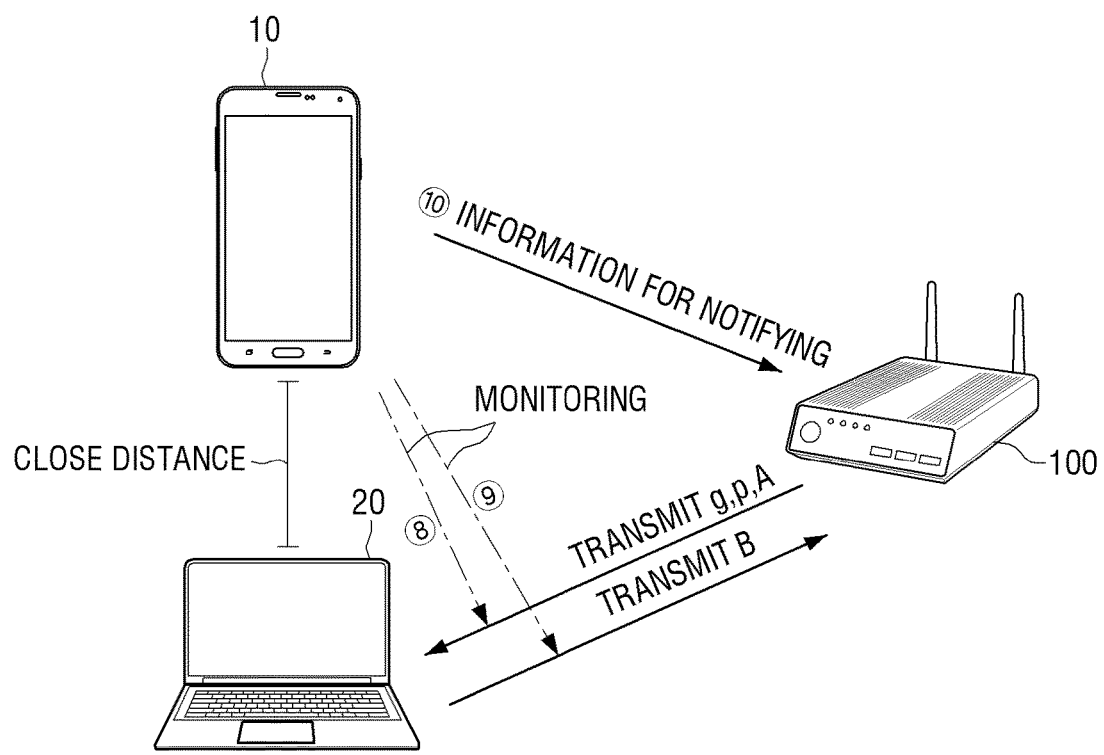

FIGS. 6A, 6B and 7 are views illustrating an example method for determining whether there is a man in the middle attack in an encryption key exchange according to the Diffie-Hellman key exchange method.

A pairing of two devices accompanies a process of exchanging encryption information for a safe communication between the two devices. For a safe pairing between two devices, the Diffie-Hellman protocol may be used. The Diffie-Hellman protocol is an asymmetric encryption method where even if there was no prior exchange of secret keys between the two devices belonging to a network, common keys may be exchanged so as to share the common secret keys.

As illustrated in FIG. 6A, the processor 130 of the network apparatus 100 may be configured to select i) a fraction, p, ii) integers from 1 to p−1, g, and iii) an integer, a, and then divide $g^a$ with p to obtain a remainder value, A. The remainder value, A, may be computed by a formula such as $A=g^a \bmod p$.

The network apparatus 100 transmits the selected fraction p, integers from 1 to p−1, g, and the remainder value, A, to the user device 20. The user device 20 selects an integer, b, and divides $g^b$ with p to obtain the remainder value, B. The remainder value, B, may be computed by a formula such as $B=g^b \bmod p$.

The user device 20 transmits the remainder value, B, to the network apparatus 100. The network apparatus 100 may determine a secret key, K, based on the remainder value, B, received from the user device 20. In the network apparatus 100, the secret key, K, may be determined based on the remainder value, B, received from the user device 20. In the network apparatus 100, the secret key, KA, may be determined by a formula such as $KA=B^a \bmod p$.

The user device 20 may also determine the secret key, K, based on the remainder value, A, received from the network apparatus 100. In the user device 20, the secret key, KB, may be determined by a formula such as $KB=A^b \bmod p$.

The secret keys, K, determined in the network apparatus 100 and user device 20 are the same, and therefore the secret key may be shared between the network apparatus 100 and user device 20 without using a key distribution center and the like.

However, there is a problem in the Diffie-Hellman protocol that it is vulnerable to a man in the middle attack. In an encryption key exchange by the Diffie-Hellman protocol, an association with the counterpart of the exchange is not guaranteed, and thus a middle man between the network apparatus 100 and user device 20 may intercept an open key. A middle device may intercept the open key from the network apparatus 100 and user device 20, and create two fake keys $KA=Z^a \bmod p$, $KB=Z^b \bmod p$, and then transmit these fake keys instead of the secret keys $KA=B^a \bmod p$, $KB=A^b \bmod p$ to the network apparatus 100 and user device 20, thereby camouflaging as if the network apparatus 100 and user device 20 are communicating with each other.

To resolve such a problem, according to the disclosure, it is possible to use the broker apparatus 10 to notify the network apparatus 100 whether a man in the middle attack by a middle man occurred. The processor 130 of the network apparatus 100 may be configured to compare at least one of the RSSI values measured by the broker apparatus 10 regarding the asymmetric key being exchanged with the user device 20 with the RSSI value measured when an association is performed with the user device 20, to determine whether a man in the middle attack occurred.

For example, referring to FIG. 6B, the broker apparatus 10 may measure each RSSI value regarding the asymmetric key (open key) being exchanged between the network apparatus 100 and user device 20 based on the Diffie-Hellman key exchange method. At the associating step explained with reference to FIGS. 3 to 5, the broker apparatus 10 pre-stores the measured RSSI value (E) regarding the association request packet and the RSSI value (F) regarding the beacon response packet.

In response to the difference between at least one of the RSSI values measured regarding each asymmetric key being exchanged between the network apparatus 100 and user device 20 and a corresponding value of the stored RSSI values E, F being outside the predetermined range, the broker apparatus 10 may transmit information regarding the aforementioned difference being outside the predetermined range.

For example, with reference to FIG. 7, the broker apparatus 10 may monitor the asymmetric keys g, p, A being transmitted from the network apparatus 100 to the user device 20 and measure the RSSI value (H). The broker apparatus 10 may also monitor the asymmetric key, B, being transmitted from the user device 20 to the network apparatus 100, and measure the RSSI value (I). The broker apparatus 10 may compare the measured RSSI value (H) and the stored RSSI value (F) to determine the amount of change of the RSSI value. The amount of change of the RSSI value may be determined by comparing the measured RSSI (I) and the stored RSSI value (E) as well. If the measured RSSI value is not the same as the stored RSSI value, it may indicate that a middle man has interrupted between the network apparatus 100 and user device 20, and thus the broker apparatus 10 may notify this to the user.

In response to the difference between the two RSSI values (among of change) being outside the predetermined range, the broker apparatus 10 may transmit information regarding the difference to the network apparatus 100.

In response to the network apparatus 100 receiving the information from the broker apparatus 10, the processor 130 may be configured to determine that a man in the middle attack has occurred, and transmit information that a man in the middle attack has occurred to the user device 20.

Figure 8:
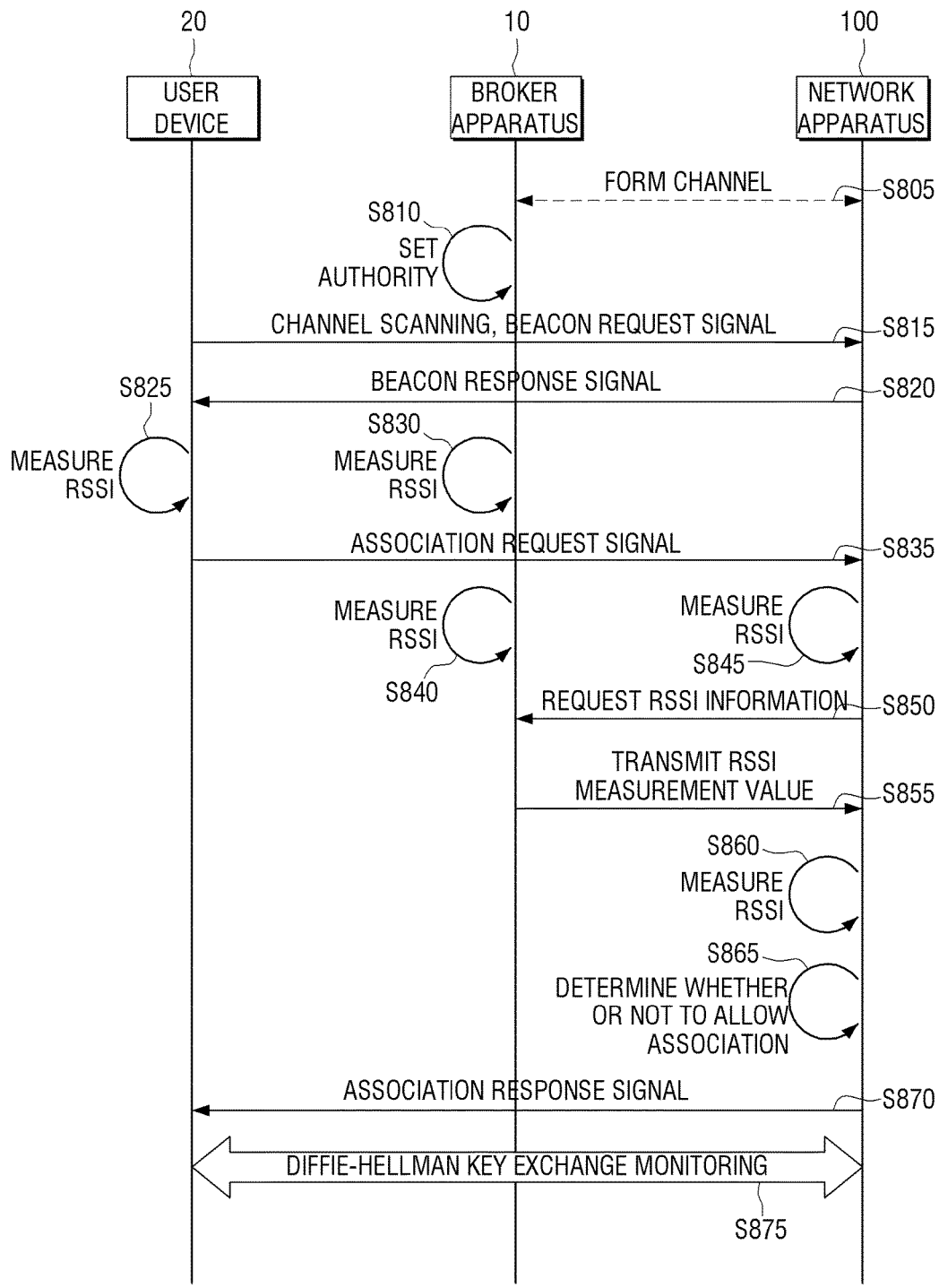
FIG. 8 is a flowchart illustrating an example method for performing a pairing between a user device and a network apparatus.

FIG. 8 is a flowchart illustrating an example method for performing a pairing between the user device and network apparatus.

The network apparatus 100 and broker apparatus 10 form a channel and perform a pairing (S805). The broker apparatus 10 is authorized to measure the RSSI value regarding a signal being exchanged between the network apparatus 100 and user device 20 (S810). The user device 20 intending to participate in the network and perform a pairing with the network apparatus 100 must be within a predetermined range of the broker apparatus 10. The network apparatus 100 that is within the predetermined range of the broker apparatus 10 scans a channel list and broadcasts a beacon request packet (S815). The network apparatus 100 may transmit a beacon response packet notifying that a PAN exists to the user device 20 (S820), and the user device 20 may measure an RSSI value (C) regarding the beacon response packet (S825). The broker apparatus 10 may also measure an RSSI value (F) regarding the beacon response packet (S830).

The user device 20 that received the beacon response packet may transmit an association request packet to the network apparatus 10 (S835). The RSSI value (C) measured in the user device 20 may be included in the association request packet and therefore be transmitted together. The broker apparatus 10 may measure an RSSI value (E) regarding the association request packet (S840). The broker apparatus 10 may store the RSSI value (F) regarding the beacon response packet and the RSSI value (E) regarding the association request packet. The network apparatus 100 may also measure the RSSI value (D) regarding the association request packet (S845). The network apparatus 100 may determine whether the identification information included in the association request packet corresponds to the identification information of the network apparatus 100, and if the two identification information do not correspond to each other, association is not performed.

The network apparatus 100 may transmit a signal requesting the measured RSSI values (E, F) from the broker apparatus 10 (S850), and the broker apparatus 10 may transmit a packet including the measured RSSI values (E, F) to the network apparatus 100 (S855). The network apparatus 100 measures an RSSI value (G) regarding the packet that includes the received RSSI values (E, F) (S860).

The network apparatus 100 may determine whether the user device 20 is close to the broker apparatus 10 within the predetermined distance (d1) based on the predetermined condition regarding the relationship between the RSSI values (A, B) stored in the storage 120 and the RSSI values (C, D, E, F, G) measured in each node, and decide whether or not to allow association of the user device 20 (S865). The predetermined condition may be a condition that has its basis on the RSSI attenuation value based on the difference between the RSSI value stored in the storage 120 and the RSSI value measured according to the distance between the network apparatus 100 and the broker apparatus 10, and for example, it may be a condition that satisfies formula 5.

In response to determining that the predetermined condition is satisfied, the network apparatus 100 may determine that the user device 20 is close to the broker apparatus 10 within the predetermined distance (d1), in which case, the network apparatus 100 may perform an association for pairing with the user device 20. For example, the network apparatus 100 may transmit an association response packet including a PAN ID and network address (Assigned short address) to the user device 20 and perform an association of the user device 20 (S870).

When the association for the user device 20 is performed, the network apparatus 100 may form a channel with the user device 20 in the Diffie-Hellman key exchange method. The broker apparatus 10 may monitor the asymmetric keys being exchanged between the network apparatus 100 and user device 20 and measure the RSSI value (H, I) of each asymmetric key being exchanged between the network apparatus 100 and the user device 20, compare the measured RSSI value (H, I) with the stored RSSI value (E, F), and notify the network apparatus 100 whether or not the RSSI value changed (S875).

Figure 9:
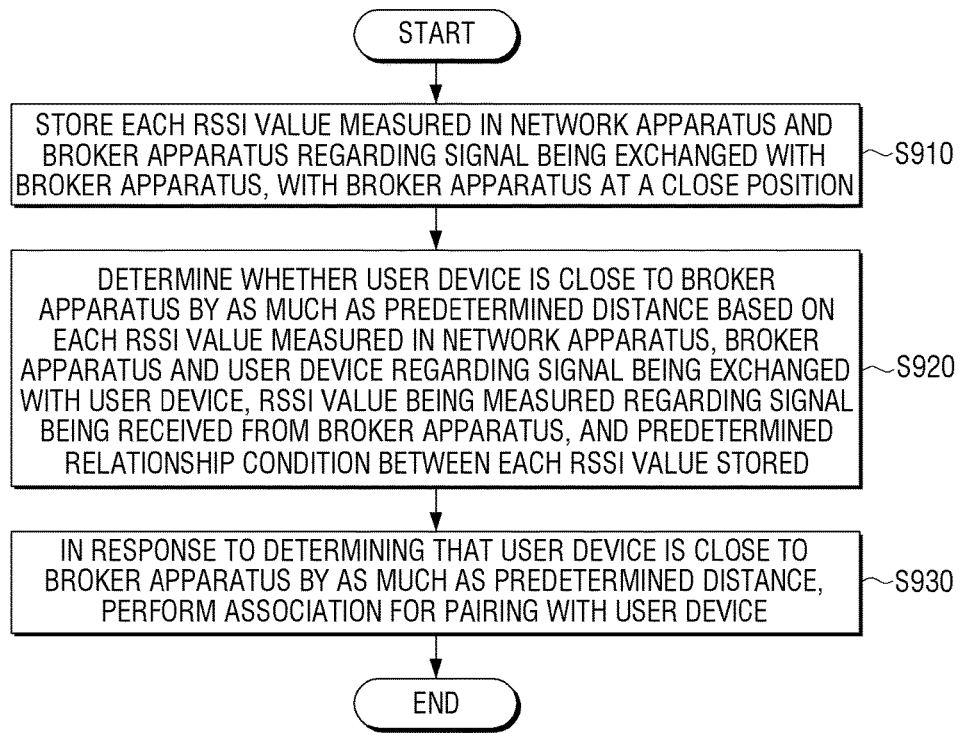
FIG. 9 is a flowchart illustrating an example method for controlling a network apparatus.

FIG. 9 is a flowchart illustrating an example method for controlling a network apparatus.

With the broker apparatus 10 being at a close position, the network apparatus 100 may store each RSSI value being measured in the network apparatus 100 and broker apparatus 10 regarding the signal being exchanged with the broker apparatus 10 (S910).

It may be determined whether the user device 20 is close to the broker apparatus 10 within the predetermined distance based on each RSSI value measured in the network apparatus 100, broker apparatus 10, and user device 20 regarding a signal being exchanged with the user device, an RSSI value measured regarding a signal being received from the broker apparatus 10, and a predetermined condition regarding a relationship between each RSSI value stored in the storage 120 (S920).

The network apparatus 100 determines an RSSI attenuation value based on the distance from the broker apparatus 10 using at least one of the RSSI values stored. The network apparatus 100 may determine whether the predetermined relationship condition is satisfied based on the RSSI attenuation value, and thus, in response to determining that the predetermined relationship condition is satisfied, the network apparatus 100 may determine that the user device 20 is close to the broker apparatus 10 within the predetermined distance.

The predetermined relationship condition may include a first condition and second condition. The first condition may be a condition where the difference between the RSSI value measured in the broker apparatus 10 and the RSSI value measured in the network apparatus 100 regarding the signal received from the user device 20 is close to the RSSI attenuation value within a predetermined range. The second condition may be a condition where the difference between the RSSI value measured in the broker apparatus 10 among the RSSI values stored and the RSSI value measured regarding the signal that the user device 20 received from the network apparatus 100 is close to the RSSI attenuation value within a predetermined range.

In response to determining that the user device 20 is close to the broker apparatus 10 within the predetermined distance, an association for pairing with the user device 20 may be performed (S930).

The network apparatus 100 may form a channel for performing pairing with the user device 20 based on the Diffie-Hellman key exchange method. According to the Diffie-Hellman key exchange method, an asymmetric key may be exchanged between the network apparatus 100 and user device 20, and information on the changes of the RSSI value may be received by the broker apparatus 10. The network apparatus 100 may determine whether a man in the middle attack occurred based on the amount of change of the RSSI value, and in response to determining that such a man in the middle attack occurred, the network apparatus 100 may notify the user device 20 that such an attack occurred.

According to various examples of the disclosure, it is possible to perform a pairing with a desired device more safely by preventing and/or reducing the likelihood of pairing by a middle man attack of a remote device that has not been associated.

A method for controlling the network apparatus according to the aforementioned various examples may be realized as a program and be stored in various record media. For example, a computer program that has been processed by various processors and therefore has become capable of executing the aforementioned control methods may be stored in a non-transitory recording medium and be used.

For example, a non-transitory computer readable medium may be provided which stores a program that performs a step of storing each RSSI value measured in the network apparatus and broker apparatus regarding a signal being exchanged between the broker apparatus with the broker apparatus at a close position, a step of determining whether the user device is close to the broker apparatus by as much as the predetermined distance based on each RSSI value measured in the network apparatus, broker apparatus, and user device regarding a signal being exchanged with the user device, an RSSI value measured regarding a signal being received from the broker apparatus, and a predetermined condition regarding a relationship between each RSSI value stored in the storage, and a step of performing an association for pairing with the user device in response to determining that the user device is close to the broker apparatus by as much as the predetermined distance.

A non-transitory computer readable medium may refer, for example, to a computer readable medium that stores data. For example, the aforementioned various applications or programs may be stored in a non-transitory computer readable medium such as a CD, DVD, hard disk, blue-ray disk, USB, memory card, and ROM, or the like, and be provided.

The foregoing examples and advantages are merely examples and are not to be construed as limiting the disclosure. The teaching can be readily applied to other types of apparatuses. Also, the description of the examples of the disclosure is intended to be illustrative, and not to limit the scope of the claims, and many alternatives, modifications, and variations will be apparent to those skilled in the art.

What is claimed is:

1. A network apparatus for performing a pairing with a user device, with the network apparatus paired with a broker apparatus, the network apparatus comprising:
   communication circuitry;
   a storage; and
   a processor configured to:
      store an RSSI value measured in each of the network apparatus and the broker apparatus regarding signals which are exchanged between the network apparatus and the broker apparatus while the network apparatus performs a pairing with the broker apparatus, determine whether the user device is within a predetermined distance from the broker apparatus, based on a predetermined condition with respect to a relationship among the stored RSSI value, an RSSI value measured regarding a signal being received from the broker apparatus after the network apparatus performing the pairing with the broker apparatus, and an RSSI value measured in each of the network apparatus, the broker apparatus and the user device with respect to signals exchanged between the network apparatus and the user device, and
      in response to determining that the user device is within the predetermined distance from the broker apparatus, to control the communication circuitry to perform an authorization for pairing the network apparatus with the user device; and
   wherein the processor is further configured to determine an RSSI attenuation value based on a difference between the stored RSSI value and the RSSI value measured regarding the signal received from the broker apparatus after the network apparatus performed the pairing with the broker apparatus, determine whether the predetermined condition is satisfied based on the determined RSSI attenuation value, and in response to determining that the predetermined condition is satisfied, determine that the user device is within the predetermined distance from the broker apparatus.

2. The network apparatus according to claim 1, wherein the predetermined condition comprises a first condition and second condition,
   the first condition being a condition where a difference between the RSSI value measured in the broker apparatus and the RSSI value measured in the network apparatus with respect to the signal being received from the user device is within a predetermined range of the RSSI attenuation value, and
   the second condition being a condition where a difference between the stored RSSI value measured in the broker apparatus and the RSSI value measured with respect to the signal that the user device received from the network apparatus is within a predetermined range of the RSSI attenuation value.

3. The network apparatus according to claim 1, wherein, in response to the authorization with the user device being completed, the processor is configured to establish a channel based on Diffie-Hellman key exchange and to perform pairing with the user device.

4. The network apparatus according to claim 3, wherein the processor is configured to determine whether a man in the middle attack occurred based on the RSSI value measured by the broker apparatus with respect to an asymmetric key being exchanged with the user device based on the Diffie-Hellman key exchange.

5. The network apparatus according to claim 4, wherein the processor is configured to determine whether the man in the middle attack occurred by comparing at least one of the RSSI values measured by the broker apparatus with respect to the asymmetric key being exchanged with the user device with the RSSI value measured when the authorization of the user device is performed.

6. The network apparatus according to claim 5,
wherein the broker apparatus stores the RSSI value being measured when the authorization with the user device is being performed, and, in response to a difference between at least one of the RSSI values measured regarding the asymmetric key being exchanged with the user device and the RSSI value measured when the authorization with the user device is performed being outside a predetermined range, transmits information on the difference to the network apparatus, and
in response to receiving the information on the difference, the processor is configured to determine that a man in the middle attack occurred, and to transmit information that a man in the middle attack occurred to the user device.

7. The network apparatus according to claim 1,
wherein the communication circuitry is configured to perform the a pairing with the broker apparatus and user device using the Zigbee method.

8. A method for pairing a user device with the network apparatus paired with a broker apparatus, the method comprising:
storing an RSSI value measured by each of the network apparatus and the broker apparatus with respect to a signals which are exchanged between the network apparatus and the broker apparatus while the performing a pairing with the broker apparatus;
determining whether the user device is within a predetermined distance from the broker device, based on a predetermined relationship condition between the stored RSSI value, and RSSI value measured regarding a signal received from the broker apparatus after performing the pairing with the broker apparatus, and an RSSI value measured by each of the network apparatus, the broker apparatus and the user device with respect to signals exchanged with the user device; and
performing an authorization for pairing the network apparatus with the user device in response to determining that the user device is within the predetermined distance from the broker apparatus; and
wherein the determining whether the user device is within the predetermined distance from the broker apparatus comprises: determining an RSSI attenuation value based on a difference between the stored RSSI value and the RSSI value measured regarding the signal received from the broker apparatus after performing the pairing with the broker apparatus, determining whether the predetermined relationship condition is satisfied based on the determined RSSI attenuation value, and in response to determining that the predetermined relationship condition is satisfied, determining that the user device is within the predetermined distance from the broker apparatus.

9. The method according to claim 8,
wherein the predetermined relationship condition comprises a first condition and second condition,
the first condition being a condition where a difference between the RSSI value measured in the broker apparatus and the RSSI value measured in the network apparatus with respect to the signal being received from the user device is within a predetermined range of the RSSI attenuation value, and
the second condition being a condition where a difference between the stored RSSI value measured in the broker apparatus and the RSSI value measured with respect to the signal that the user device received from the network apparatus is within a predetermined range of the RSSI attenuation value.

10. The method according to claim 8,
further comprising establishing a Diffie-Hellman key exchange channel to perform the pairing with the user device.

11. The method according to claim 10,
wherein establishing a channel includes determining whether a man in the middle attack occurred based on the RSSI value measured by the broker apparatus regarding an asymmetric key being exchanged with the user device based on the Diffie-Hellman key exchange.

12. The method according to claim 11,
wherein establishing a channel includes determining whether the man in the middle attack occurred by comparing at least one of the RSSI values measured by the broker apparatus regarding the asymmetric key being exchanged with the user device with the RSSI value measured when the authorization of the user device is performed.

13. The method according to claim 12,
wherein the broker apparatus stores the RSSI value being measured when the authorization with the user device is being performed, and, in response to a difference between at least one of the RSSI value each measured regarding the asymmetric key being exchanged with the user device and the RSSI value measured when the authorization with the user device is performed being outside a predetermined range, and transmits information on the difference to the network apparatus, and
establishing a channel includes, in response to receiving the information that a difference between at least one of the RSSI value measured regarding the asymmetric key being exchanged with the user device and the RSSI value measured when the authorization with the user device is performed is outside the predetermined range, determining that a man in the middle attack occurred.

14. The method according to claim 8, wherein the network apparatus performs the pairing with the broker apparatus and user device using the Zigbee method.

* * * * *